United States Patent
Gao et al.

(10) Patent No.: US 12,024,592 B2
(45) Date of Patent: Jul. 2, 2024

(54) HYPERBRANCHED POLYLYSINE POWDER WITH LOW POLYDISPERSITY INDEX AND PRODUCTION METHOD THEREOF

(71) Applicant: ZHEJIANG UNIVERSITY, Zhejiang (CN)

(72) Inventors: Changyou Gao, Hangzhou (CN); Xiaofei Dong, Hangzhou (CN); Zhaolong Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/473,318

(22) Filed: Sep. 25, 2023

(65) Prior Publication Data

US 2024/0018303 A1    Jan. 18, 2024

Related U.S. Application Data

(63) Continuation of application No. PCT/CN2022/073555, filed on Jan. 24, 2022.

(30) Foreign Application Priority Data

Jan. 20, 2022  (CN) .......................... 202210065573.7

(51) Int. Cl.
*C08G 69/10*   (2006.01)
*C08J 3/12*    (2006.01)

(52) U.S. Cl.
CPC ................ *C08G 69/10* (2013.01); *C08J 3/12* (2013.01); *C08J 2377/04* (2013.01)

(58) Field of Classification Search
USPC ....................................................... 528/314
See application file for complete search history.

(56) References Cited

U.S. PATENT DOCUMENTS

2008/0206183 A1   8/2008   Commeyras et al.
2020/0368270 A1   11/2020  Ji et al.

FOREIGN PATENT DOCUMENTS

| CN | 101316860 A | 12/2008 |
| CN | 107349434 A | 11/2017 |
| CN | 108129656 A | 6/2018 |
| CN | 108484901 A | 9/2018 |
| CN | 111035803 A | 4/2020 |
| CN | 111885998 A | 11/2020 |
| CN | 113717378 A | 11/2021 |
| WO | 2016062578 A1 | 4/2016 |

OTHER PUBLICATIONS

International Search Report (PCT/CN2022/073555); Date of Mailing: Oct. 21, 2022.
First Office Action(CN202210065573.7); Date of Mailing: Oct. 31, 2022.
Notice Of Allowance(CN202210065573.7); Date of Mailing: Apr. 13, 2023.
The-Thermal-Polymerization-of-Amino Acids-Revisited; Synthesis-and-Structural-Characterization-of-Hyperbranched-Polymers-from-L-Lysine.

*Primary Examiner* — Terressa Boykin
(74) *Attorney, Agent, or Firm* — W&G Law Group

(57) ABSTRACT

The present application belongs to the technical field of polymer materials, and hyperbranched polylysine powder with a low polydispersity index and a production method thereof provided. The present application adopts a thermal initiation polymerization method, Compared with the traditional method, the production method of hyperbranched polylysine has the advantages of no additional steps of introducing and removing amino protecting groups, no need of activating carboxyl groups, easy purification of products, short production period, controllable molecular weight of products and low polydispersity index (1.01-1.2), and is suitable for industrial production of hyperbranched polylysine materials, especially medical-grade hyperbranched polylysine materials.

5 Claims, 3 Drawing Sheets

HYPERBRANCHED POLYLYSINE POWDER WITH LOW POLYDISPERSITY INDEX AND PRODUCTION METHOD THEREOF

TECHNICAL FIELD

The present application belongs to the technical field of polymer materials, and particularly relates to hyperbranched polylysine powder with a low polydispersity index and a production method thereof.

BACKGROUND

As the basic unit of biological functional macromolecule protein, L-lysine is one of the basic substances that constitute the protein for animal and human nutrition. There are two amino groups of the α site and ε site in L-lysine molecule. According to different polymerization methods, L-lysine can be polymerized to obtain two different polymers, namely linear polylysine and hyperbranched polylysine. There are two kinds of linear polymers, i.e., α-polylysine (PLL) and s-polylysine (ε-PL). Among them, PLL is a polycation, which can have electrostatic interaction with negatively charged cell membranes to promote cell adhesion and tissue regeneration. Most of ε-PL is obtained by bacterial fermentation. Studies have confirmed that ε-PL with a molecular weight greater than 1300 Da can be adsorbed on the outer membrane of bacteria and fungi, releasing a large amount of lipopolysaccharide and destroying the outer membrane of microorganisms, thus achieving the antibacterial effect; ε-PL with a high molecular weight is a natural preservative with broad-spectrum antibacterial activity, which has been applied to food preservatives in Japan and other countries.

Hyperbranched polylysine is a kind of lysine polymers with a highly branched three-dimensional structure, and the molecular structure thereof has structural units of both PLL and ε-PL. Therefore, hyperbranched polylysine has biological and chemical functions of both PLL and ε-PL. Compared with linear polylysine, hyperbranched polylysine has a large number of branching points in the molecule, the molecular chain is not easy to entangle, the viscosity is low, and it has excellent fluidity and film-forming performance; hyperbranched polylysine is rich in terminal functional groups and thus can be easily modified, which is beneficial to the synthesis of various functional materials. In addition, hyperbranched polylysine obtained by L-lysine polymerization can be degraded into L-lysine under the catalysis of enzymes in vivo, which has good biocompatibility and biodegradability and has a wide application prospect in the fields of chemical industry, biology, medicine and health.

At present, there are three main preparation methods of hyperbranched polylysine reported in the literature: (1) step-by-step polymerization based on a L-lysine *2HCl derivative activated on a carboxyl group, which has the disadvantage that the carboxyl functional group must be activated by a specific reactant, and the reaction path is multi-step and complicated; (2) ring-opening addition polymerization based on s-protected L-lysine-N-carboxylic anhydride, which has the disadvantage that it requires protecting groups, the reaction steps are complicated and the products are difficult to purify; (3) thermal polymerization of free L-lysine, the reaction steps of which are simple, but the reaction time is long, usually taking several days, and the production efficiency is low. In addition, the products made by the existing production methods often have the following common problems. (1) The obtained polymers often have a wide molecular weight distribution, and the polydispersity index PDI is hardly lower than 2, and PDI increases with the increase of molecular weight. This kind of hyperbranched polylysine with a high PDI is mixed with a large number of low molecular weight polymers, which greatly affects the properties of the product, especially the biological properties. For example, hyperbranched polylysine with a low molecular weight (<1300 Da) has no antibacterial property, while hyperbranched polylysine with a high molecular weight has good killing ability to both gram-positive bacteria and gram-negative bacteria. (2) The directly prepared products are often continuous blocky solids after freeze-drying or drying treatment. On the one hand, blocky solids have slow dissolution speed, on the other hand, they are not suitable for direct measurement, especially for measurement as trace components in biological applications.

SUMMARY

In view of the shortcomings of the previous reported methods, the present application provides a production method of hyperbranched polylysine with a controllable molecular weight and a low polydispersity index, with no additional steps of introducing and removing amino protecting groups, no need of activating carboxyl groups, involve easy purification step to obtain pristine products and short production period.

According to the hyperbranched polylysine powder with a low polydispersity index and a production method thereof, the hyperbranched polylysine is characterized in that the molecular weight is controllable, and the method is a thermal polymerization process, and a polymer with the number average molecular weight between 3000 Da and 7000 Da can be prepared by controlling the reaction conditions; the polydispersity index is low, and the PDI ranges from 1.01 to 1.20.

The present application relates to hyperbranched polylysine powder with a low polydispersity index and a production method thereof. The preparation method of hyperbranched polylysine includes the following steps:

adding 10-90 parts by weight of an amino acid monomer, 1-10 parts by weight of alkali and 0.01-5 parts by weight of a catalyst into a kettle reactor, heating to 120-180° C., reacting for 12-24 hours under the condition of stirring and nitrogen protection, then cooling to stop the reaction to obtain a crude product, and performing a purifying and drying treatment on the crude product to obtain the pristine hyperbranched polylysine powder.

The amino acid monomer is at least one of L-lysine, L-lysine monohydrate, L-lysine dihydrate, L-lysine acetate, L-lysine monohydrochloride, L-lysine dihydrochloride and L-lysine sulfate.

The alkali is at least one of ammonia hydroxide, lithium hydroxide, sodium hydroxide and potassium hydroxide.

The catalyst is at least one of zirconium n-butanol, titanium n-butanol, dibutyltin dilaurate, tripyridine boric acid and antimony ethoxide.

The stirring is mechanical stirring, and has a stirring speed of 300-500 rpm.

The purifying and drying treatment comprises the following steps: dissolving 50-100 parts by weight of the crude product in 50-200 parts by weight of alcohol, centrifuging a suspension to separate supernatant, and drying the supernatant by aerosol to obtain the hyperbranched polylysine powder.

The alcohol is at least one of methanol and ethanol.

The present application has the beneficial effects that:

Compared with the traditional method, the production method of hyperbranched polylysine disclosed by the present application has the advantages of no additional steps of introducing and removing amino protecting groups, no need of activating carboxyl groups, easy purification of products and short production period; more importantly, the hyperbranched polylysine prepared by the method of the present application has a low polydispersity index (PDI can be as low as below 1.2) and controllable product molecular weight (a number average molecular weight of 3,000-7,000 Da), and is particularly suitable for industrial production of hyperbranched polylysine materials.

DESCRIPTION OF EMBODIMENTS

The present application will be further explained with the attached drawings and specific examples.

Example 1

2000 g of L-lysine sulfate, 655.7 g of solid sodium hydroxide and 2 g of dibutyltin dilaurate were added into a 5 L reactor equipped with a stirrer, an internal thermometer, an air inlet pipe, a condenser with a collector. The mixture was gradually heated to the internal temperature of 140° C., the stirring speed was 400 rpm, and the nitrogen flow rate was 50 cm$^3$/min. After 12 hours, the heating was stopped, and a hyperbranched polylysine crude product was discharged from outlet at the bottom while it was hot. The crude product was added into 3000 mL of ethanol and fully mixed to obtain a suspension containing hyperbranched polylysine. An ethanol solution of hyperbranched polylysine was obtained after centrifugal separation of the suspension at 3000 rpm, and the solution was injected into an aerosol drying tower for drying to obtain pure hyperbranched polylysine powder.

Figure 1:
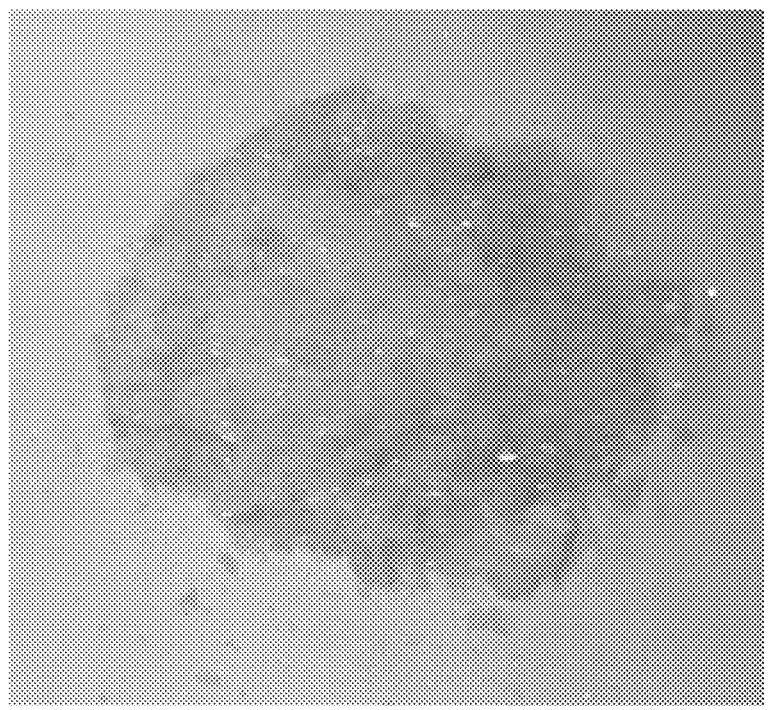
FIG. 1 is an exhibition diagram of hyperbranched polylysine powder prepared by the present application.

The hyperbranched polylysine prepared in this example was yellow powder, as shown in FIG. 1.

Figure 2:
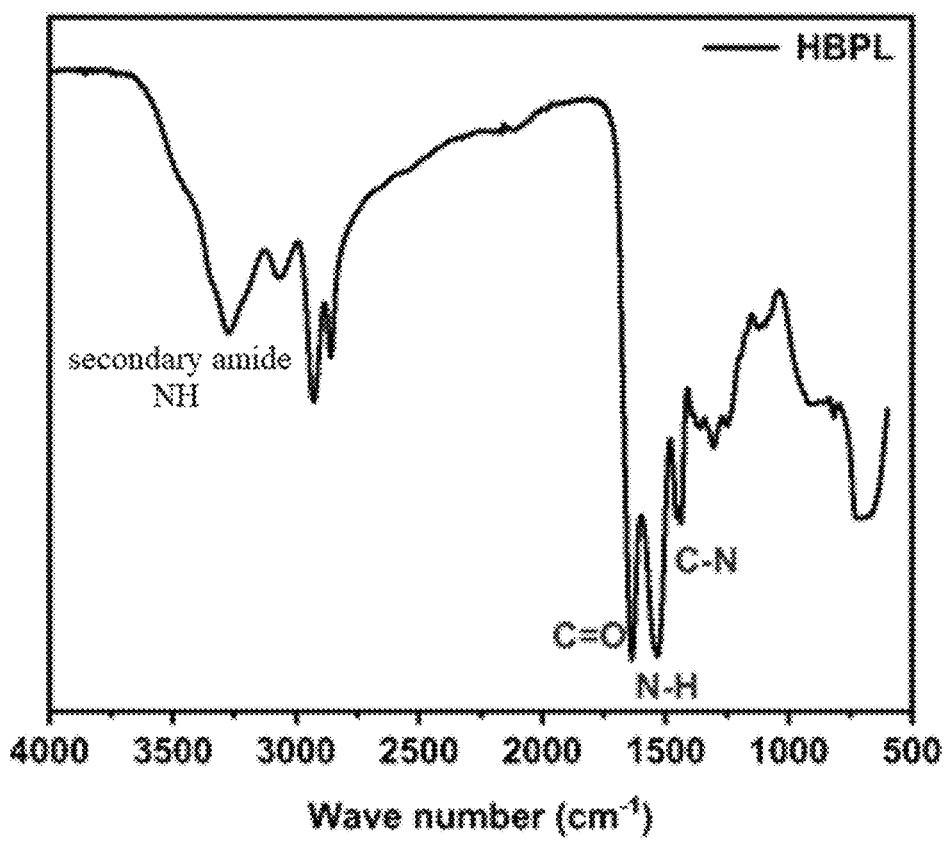
FIG. 2 is a FTIR spectrum of hyperbranched polylysine prepared by the present application.

The FTIR spectrum of hyperbranched polylysine prepared in this example is shown in FIG. 2.

Figure 3:
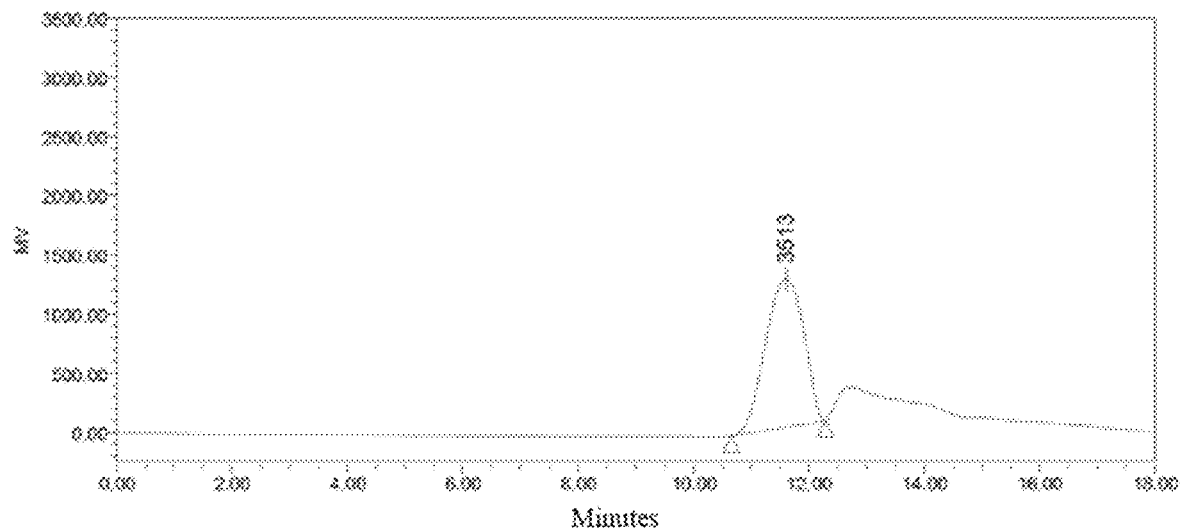
FIG. 3 is a GPC chart of hyperbranched polylysine with a number average component of 3438 Da and a dispersion of 1.19.

The number average molecular weight of the hyperbranched polylysine prepared in this example is 3438 Da, the PDI is 1.19, and its GPC spectrum is shown in FIG. 3.

| | | | | | | | |
|---|---|---|---|---|---|---|---|
| | | | | GPC results | | | |
| Distribution name | Mn (Dalton) | Mw (Dalton) | MP | Mz (Dalton) | Mz + 1 (Dalton) | Polydispersity | MW marker 1 (Dalton) | MW marker 2 (Dalton) |
| 1 | 3438 | 4079 | 3513 | 4853 | 5708 | 1.186405 | | |

Example 2

2000 g of L-lysine sulfate, 600 g of solid lithium hydroxide and 2 g of zirconium n-butoxide were added into a 5 L reactor equipped with a stirrer, an internal thermometer, an air inlet pipe, a condenser and a collector. The mixture was gradually heated to the internal temperature of 140° C., the stirring speed was 400 rpm, and the nitrogen flow rate was 50 cm$^3$/min. After 16 hours, the heating was stopped, and a hyperbranched polylysine crude product was discharged from the bottom collector while it was hot. The crude product was added into 2000 mL of ethanol and fully mixed to obtain a suspension containing hyperbranched polylysine. An ethanol solution of hyperbranched polylysine was obtained after centrifugal separation of the suspension at 3000 rpm, and the solution was injected into an aerosol drying tower for drying to obtain pure hyperbranched polylysine powder.

Figure 4:
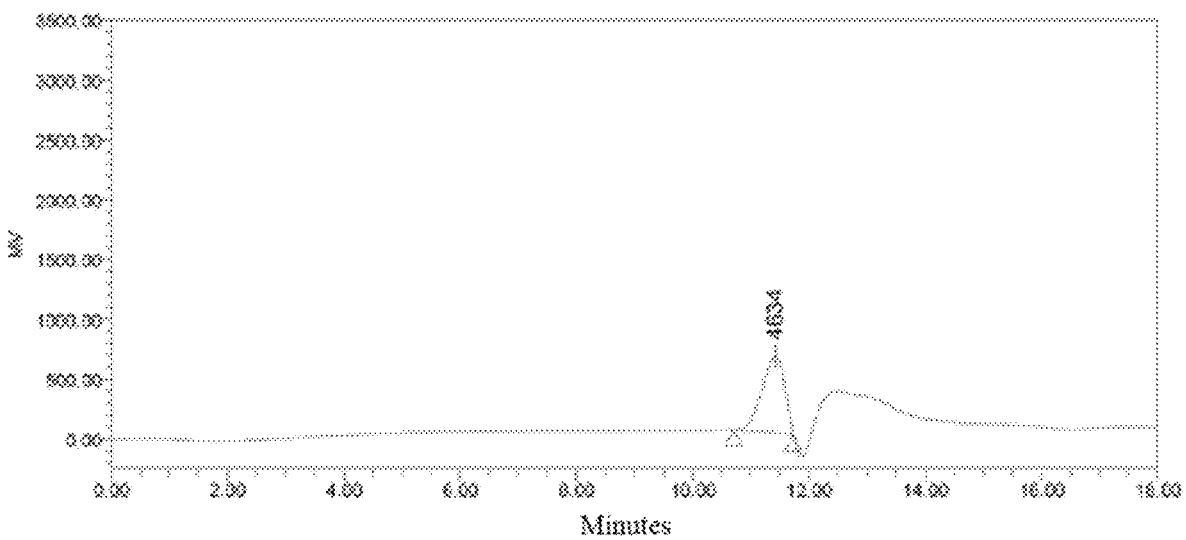
FIG. 4 is a GPC chart of hyperbranched polylysine with a number average component of 4899 Da and a dispersion of 1.07.

The number average molecular weight of the hyperbranched polylysine prepared in this example is 4899 Da, the PDI is 1.07, and its GPC spectrum is shown in FIG. 4.

| | | | | | | | |
|---|---|---|---|---|---|---|---|
| | | | | GPC results | | | |
| Distribution name | Mn (Dalton) | Mw (Dalton) | MP | Mz (Dalton) | Mz + 1 (Dalton) | Polydispersity | MW marker 1 (Dalton) | MW marker 2 (Dalton) |
| 1 | 4899 | 5250 | 4634 | 5672 | 6166 | 1.071614 | | |

Example 3

Figure 5:
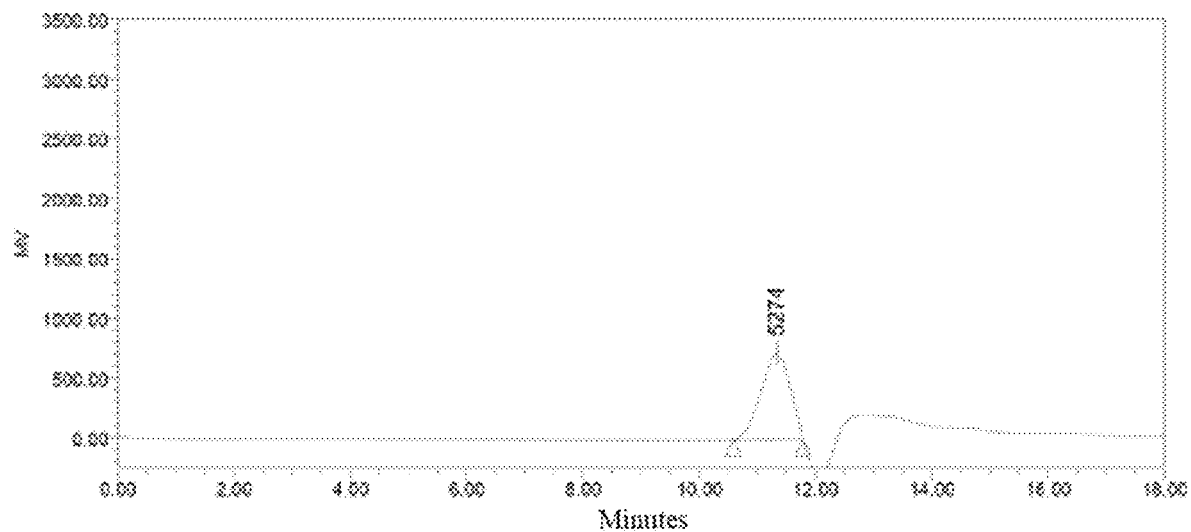
FIG. 5 is a GPC chart of hyperbranched polylysine with a number average component of 5299 Da and a dispersion of 1.11.

2000 g of L-lysine sulfate, 700 g of solid potassium hydroxide and 2 g of tripyridine boric acid were added into a 5 L reactor equipped with a stirrer, an internal thermometer, an air inlet pipe, a condenser and a collector. The mixture was gradually heated to the internal temperature of 140° C. under stirring and nitrogen protection. After 20 hours, the heating was stopped, and a hyperbranched polylysine crude product was discharged from the bottom collector while it was hot. The crude product was added into 1500 mL of ethanol and fully mixed to obtain a suspension containing hyperbranched polylysine. An ethanol solution of hyperbranched polylysine was obtained after centrifugal separation of the suspension at 3000 rpm, and the solution was injected into an aerosol drying tower for drying to obtain pure hyperbranched polylysine powder. The number average molecular weight of hyperbranched polylysine prepared in this example is 5299 Da, the PDI is 1.11, and its GPC spectrum is shown in FIG. 5.

| | | | GPC results | | | | | |
|---|---|---|---|---|---|---|---|---|
| Distribution name | Mn (Dalton) | Mw (Dalton) | MP | Mz (Dalton) | Mz + 1 (Dalton) | Polydispersity | MW marker 1 (Dalton) | MW marker 2 (Dalton) |
| 1 | 5299 | 5907 | 5274 | 6625 | 7425 | 1.114665 | | |

Comparative Example 4

Hyperbranched polylysine was prepared according to the method in the previous reported work (for example, CN111035803B, a titanium implant material with anti-infection and bone bonding promoting functions and a preparation method thereof, specification, page 2, [0014]).

A KOH solution (8.4 g dissolved in 30 mL water) was slowly dropped into a lysine hydrochloride solution (27.45 g dissolved in 50 mL water), with a molar ratio of lysine hydrochloride to KOH being 1:1, and the reaction was carried out for 4-5 h at 40° C., and then the temperature was raised to 150° C., during which the water in the reaction system was maintained timely, and the stirring was continued for 2-3-5 d. After stopping stirring, methanol was added to dissolve the melt, and then the solvent was converted into water and dialyzed for 3-5 d, followed by freezing and drying.

Figure 6:
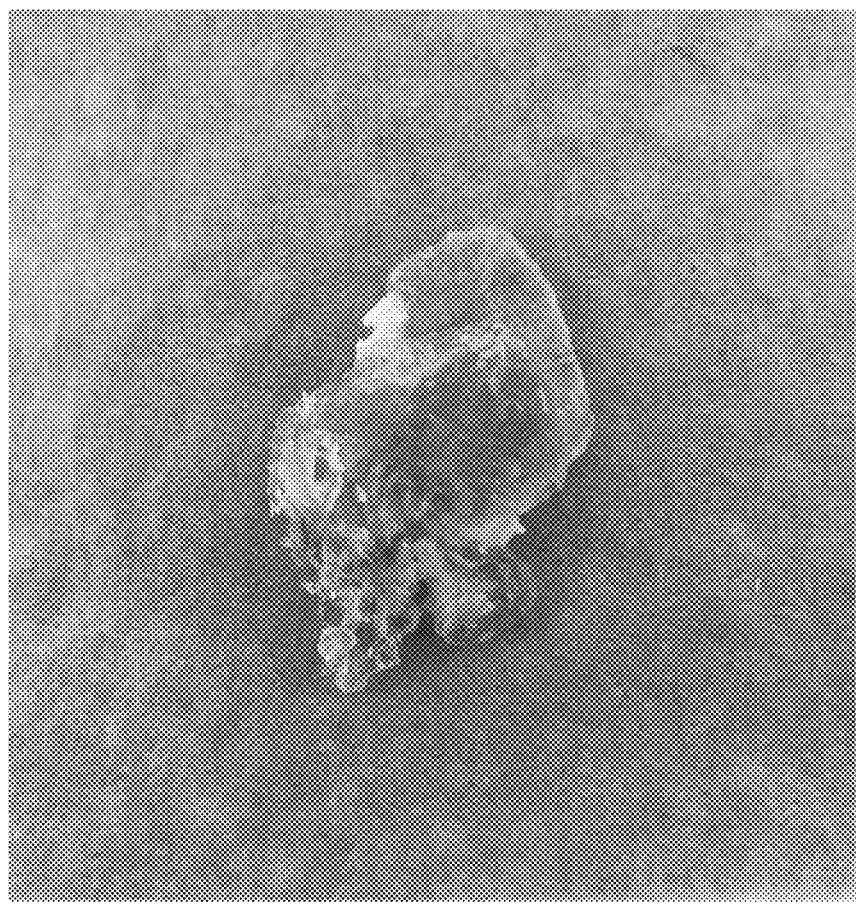
FIG. 6 shows the hyperbranched polylysine prepared in Comparative Example 4.

The total synthesis time was 3-4 days, the reaction rate was low, the post-treatment time was 3-5 days, and the period was long; during the reaction process, it was required to to add water at different reaction times according to the experience of operators, which cannot be used in automatic industrial production process; the product must be dialyzed to remove the low molecular weight polymer without antibacterial function; before dialysis, the number average molecular weight of the polymer as determined by GPC was 3860, and the PDI was 2.14; after dialysis, the number average molecular weight of the polymer as determined by GPC was 6100, and the PDI was 1.34; the obtained product (as shown in FIG. 6) was a hard block material, which could only be weighed for use after grinding.

The above-mentioned embodiment is the preferred embodiment of the present application, but the embodiment of the present application is not limited by the above-mentioned embodiment, and any other changes, modifications, substitutions, combinations and simplifications made without departing from the spirit and principle of the present application shall be equivalent substitutions, which are all included in the protection scope of the present application.

What is claimed is:

1. A production method of hyperbranched polylysine powder with a low polydispersity index, by a thermal initiation polymerization method, comprising: adding 10-90 parts by weight of an amino acid monomer, 1-10 parts by weight of alkali, and 0.01-5 parts by weight of a catalyst into a kettle reactor, heating to 120-180° C., reacting for 12-24 hours under the condition of stirring and nitrogen protection, then cooling to stop the reaction to obtain a crude product, and performing a purifying and drying treatment on the crude product to obtain the hyperbranched polylysine powder, wherein the polydispersity index PDI of the hyperbranched polylysine powder is 1.01-1.2, wherein the amino acid monomer is at least one of L-lysine, L-lysine monohydrate, L-lysine dihydrate, L-lysine acetate, L-lysine monohydrochloride, L-lysine dihydrochloride and L-lysine sulfate, wherein the alkali is at least one of ammonia hydroxide, lithium hydroxide, sodium hydroxide and potassium hydroxide, wherein the catalyst is at least one of zirconium n-butanol, titanium n-butanol, dibutyltin dilaurate, 3-pyridinylboronic acid and antimony ethoxide.

2. The production method of hyperbranched polylysine powder with a low polydispersity index according to claim 1, wherein a number average molecular weight of the hyperbranched polylysine powder is 3000-7000 Da.

3. The production method of hyperbranched polylysine powder with a low polydispersity index according to claim 1, wherein the stirring is mechanical stirring, and has a stirring speed of 300-500 rpm.

4. The production method of hyperbranched polylysine powder with a low polydispersity index according to claim 1, wherein the purifying and drying treatment comprises that: dissolving 50-100 parts by weight of the crude product in 50-200 parts by weight of alcohol, centrifuging a suspension to separate supernatant, and drying the supernatant by aerosol to obtain the hyperbranched polylysine powder.

5. The production method of hyperbranched polylysine powder with a low polydispersity index according to claim 4, wherein the alcohol is at least one of methanol and ethanol.

* * * * *